United States Patent
Hill et al.

(10) Patent No.: US 11,945,933 B2
(45) Date of Patent: Apr. 2, 2024

(54) STABILIZED POLYURETHANE COMPOSITION

(71) Applicant: SI GROUP USA (USAA), LLC, Danbury, CT (US)

(72) Inventors: Jonathan Hill, Reinach Blonay (CH); Maurice Power, Reinach Blonay (CH)

(73) Assignee: SI Group, Inc., The Woodlands, TX (US)

(*) Notice: Subject to any disclaimer, the term of this patent is extended or adjusted under 35 U.S.C. 154(b) by 0 days.

(21) Appl. No.: 17/503,960

(22) Filed: Oct. 18, 2021

(65) Prior Publication Data
US 2022/0033619 A1    Feb. 3, 2022

Related U.S. Application Data

(62) Division of application No. 15/754,916, filed as application No. PCT/EP2016/070666 on Sep. 1, 2016, now Pat. No. 11,180,631.

(30) Foreign Application Priority Data

Sep. 3, 2015 (GB) ..................... 1515640

(51) Int. Cl.

| C08G 18/76 | (2006.01) |
|---|---|
| C08G 18/16 | (2006.01) |
| C08G 18/20 | (2006.01) |
| C08G 18/24 | (2006.01) |
| C08G 18/48 | (2006.01) |
| C08J 9/00 | (2006.01) |
| C08K 5/13 | (2006.01) |
| C08K 5/134 | (2006.01) |
| C08K 5/375 | (2006.01) |

(52) U.S. Cl.
CPC ............. *C08K 5/13* (2013.01); *C08G 18/165* (2013.01); *C08G 18/2063* (2013.01); *C08G 18/244* (2013.01); *C08G 18/48* (2013.01); *C08G 18/7621* (2013.01); *C08J 9/0023* (2013.01); *C08K 5/1345* (2013.01); *C08K 5/375* (2013.01); *C08G 2110/0083* (2021.01); *C08J 2375/04* (2013.01)

(58) Field of Classification Search
CPC .. C08G 18/00; C08G 18/165; C08G 18/2063; C08G 18/244; C08G 18/4018; C08G 18/42; C08G 18/48; C08G 18/7621; C08G 2110/0083; C08J 9/0023; C08J 2375/04; C08K 5/00; C08K 5/005; C08K 5/13; C08K 5/134; C08K 5/1345; C08K 5/36; C08K 5/375; C08L 75/04
See application file for complete search history.

(56) References Cited

U.S. PATENT DOCUMENTS

| 4,824,601 | A | 4/1989 | Franklin |
| 5,238,606 | A | 8/1993 | Inoue et al. |
| 5,772,921 | A | 6/1998 | Gilg et al. |
| 6,676,849 | B2 | 1/2004 | Demassa |
| 6,881,774 | B2 | 4/2005 | Schrinner et al. |
| 7,199,181 | B2 | 4/2007 | Heidenefelder et al. |
| 7,964,002 | B2 | 6/2011 | Deblase et al. |
| 8,721,946 | B2 | 5/2014 | Lederer et al. |
| 9,034,956 | B2 * | 5/2015 | Li .................. C08K 5/375 524/100 |
| 10,214,627 | B2 | 2/2019 | Van Mierloo et al. |
| 11,180,631 | B2 * | 11/2021 | Hill .................. C08J 9/0023 |
| 2005/0004275 | A1 | 1/2005 | Heidenfelder et al. |
| 2005/0006627 | A1 * | 1/2005 | Semen .............. C08K 5/13 252/399 |
| 2006/0040833 | A1 | 2/2006 | Al-Akhdar et al. |

(Continued)

FOREIGN PATENT DOCUMENTS

| CN | 101421343 | 4/2009 |
| CN | 103709713 | 4/2014 |

(Continued)

OTHER PUBLICATIONS

International Search Report and Written Opinion of the International Searching Authority of International Application No. PCT/EP2016/070666 dated Nov. 9, 2016.

(Continued)

*Primary Examiner* — John M Cooney
(74) *Attorney, Agent, or Firm* — Dority & Manning, P.A.

(57) ABSTRACT

The present invention provides a stabilising composition, comprising:
a) a first phenolic antioxidant comprising one or more phenolic compounds having the structure of formula (I):

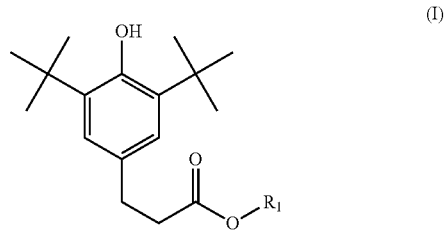

wherein $R_1$ is a linear or branched alkyl group having from 12 to 20 carbon atoms; and
b) one or more second phenolic antioxidants independently selected from:
a mono-hydroxybenzene having lower steric hindrance than the first phenolic antioxidant;
a di-hydroxybenzene; and/or
a tri-hydroxybenzene.

19 Claims, No Drawings

(56) References Cited

U.S. PATENT DOCUMENTS

| | | |
|---|---|---|
| 2006/0167207 A1 | 7/2006 | Thiele et al. |
| 2007/0185250 A1 | 8/2007 | Mader et al. |
| 2007/0249778 A1 | 10/2007 | Clemens |
| 2007/0257234 A1* | 11/2007 | Gerster ............... C08K 5/315 |
| | | 549/462 |
| 2009/0162307 A1* | 6/2009 | Fritzsche ............ C07C 49/84 |
| | | 568/329 |
| 2011/0230579 A1 | 9/2011 | Demassa |
| 2017/0073497 A1 | 3/2017 | Zahalka et al. |

FOREIGN PATENT DOCUMENTS

| | | |
|---|---|---|
| WO | 2015078877 | 6/2015 |
| WO | 2015167856 | 11/2015 |
| WO | 2015173315 | 11/2015 |

OTHER PUBLICATIONS

Combined Search and Examination Report of Application No. GB1515640.9 dated Mar. 1, 2016.

\* cited by examiner

STABILIZED POLYURETHANE COMPOSITION

This application is a Divisional of U.S. patent application Ser. No. 15/754,916, filed Feb. 23, 2018, which is a 371 National Stage application of International PCT Application No. PCT/EP2016/070666, filed Sep. 1, 2016, and claims benefit of priority to United Kingdom Application No. 1515640.9, filed Sep. 3, 2015, all of which are herein incorporated by reference in their entirety.

The present invention concerns a stabilising composition. The stabilising composition comprises a first phenolic antioxidant and one or more second phenolic antioxidants with higher activity than the first phenolic antioxidant. The stabilising composition is particularly useful for the stabilisation of polyols and polyurethanes, including polyurethane foam.

Polyurethanes constitute a class of polymers with a range of structures, properties and applications. They all have carbamate or urethane linkages i.e. —NH—C(=O)—O—, and can be made by reacting isocyanates with polyols. Polyurethanes can be tailored according to the choice of isocyanate and polyol, the presence of other components, and the reaction conditions. Polyurethanes include thermoplastic materials and thermosetting materials, and are used to produce flexible and rigid foams, coatings, fibres, moulded products, elastomeric components, seals and adhesives, amongst other products.

Polyurethanes are susceptible to degradation over time. Preparation or processing of the polyurethanes can also bring about or enhance degradation. One of the main causes of degradation, as with many other organic materials, is the reaction with oxygen in a free radical autoxidation cycle. The formation of free radicals can be triggered or enhanced by exposure of the polyurethane to heat or radiation (particularly UV light), or the reaction of the polymer with other components or impurities. The free radicals may then react with oxygen to form peroxy radicals. The peroxy radicals may then react with further polymer species to produce hydroperoxides, which themselves decompose to result in further reactive free radical species.

This type of polymer degradation is often referred to as scorch. Scorch may be detected in a polymer product, for example a polyurethane foam, by the appearance of darker regions in the polymer.

Antioxidants are often used to break the polymer degradation cycle, thus reducing the amount of scorch. Some antioxidants, known as primary antioxidants, are designed to react with peroxy radicals. Other antioxidants, known as secondary antioxidants, are designed to react with hydroperoxides.

Types of primary antioxidants include sterically hindered phenols and aminic compounds, in particular secondary arylamines, for example those disclosed in U.S. Pat. No. 4,824,601. It is known to use these two types of primary antioxidants in combination for the stabilisation of polyurethanes.

Our co-pending application GB 1403714.7 discloses a stabilising composition for polymeric materials, in particular polyurethane, comprising at least one secondary arylamine having the formula I:

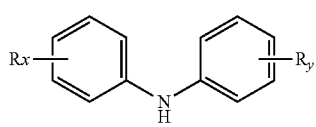

(I)

wherein: the or each R, which may be the same or different, independently denotes an optionally substituted higher aliphatic hydrocarbyl group; x and y are each independently from 0 to 5 provided that at least one of x and y is at least 1; and a phenolic antioxidant, the composition and/or the secondary arylamine being a liquid at ambient conditions and being substantially free from diphenylamine and/or from lower alkylated diphenylamine antioxidants.

Although stabilising compositions comprising a phenolic component and an aminic component have demonstrated effective in-process stabilisation of polyurethanes, in particular good scorch performance, there are regulatory concerns surrounding the use of aminic components in such compositions. In particular, there are regulatory concerns surrounding diphenylamine, which is the precursor for many aminic antioxidants and is often present in aminic antioxidants in residual amounts.

In addition, when exposed to pollutant gases such as oxides of nitrogen, amine-containing stabilising compositions have a tendency to perform poorly with regards to discolouration.

Phenolic antioxidants alone tend not to perform as well as phenolic/aminic stabilising compositions with regards to scorch performance. Thus, alternatives to amine antioxidants in the stabilising composition have been considered.

One alternative considered in the prior art is a stabilising composition having a phenolic antioxidant and a benzofuranone component such as those disclosed in EP 1291384. The benzofuranone component acts as a 'booster' i.e. a non-aminic component which improves the scorch performance of the stabilising composition beyond the base stabilisation of the phenolic component. However, such benzofuranone components are expensive. Thus, there is a demand for lower-cost alternatives.

Another alternative considered in the prior art is a stabilising composition having a phenolic antioxidant and 4-tertbutyl catechol.

U.S. Pat. No. 6,676,849 discloses a scorch inhibitor composition for use as an additive in the manufacture of polyurethane foams, comprising: a derivatised di-tert-butyl phenol substituted with an aromatic, aliphatic or aromatic-aliphatic moiety of $C_2$ or greater, the moiety optionally possessing combinations of heteroatoms, which optionally may be dimerized; 4-tertbutyl catechol; and optionally phenothiazine.

However, such stabilising compositions tend to be highly emissive, in particular with regard to volatile organic compounds (VOC). There is now a strong demand, particularly from the automotive industry, to reduce the amount of VOC emissions from stabilising composition.

Thus, there remains a need for amine-free antioxidant stabilising compositions which overcome the above-identified problems associated with the prior art compositions, and which satisfy the requirements of an antioxidant stabilising composition with regard to shelf-life, sensitivity to hydrolysis, in-process stabilisation, scorch protection, colour properties, volatility and protection against light and pollutant gases.

According to a first aspect of the present invention there is provided a stabilising composition, comprising:

a) a first phenolic antioxidant comprising one or more phenolic compounds having the structure of formula (I):

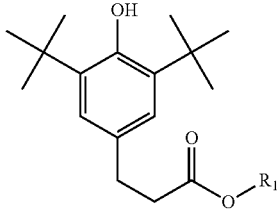

wherein $R_1$ is a linear or branched alkyl group having from 12 to 20 carbon atoms; and
b) one or more second phenolic antioxidants independently selected from:
  a mono-hydroxybenzene having lower steric hindrance than the first phenolic antioxidant;
  a di-hydroxybenzene; and/or
  a tri-hydroxybenzene.

According to a second aspect of the present invention there is provided the use of a stabilising composition for stabilising a polyol and/or a polyurethane, the stabilising composition comprising:
a) a first phenolic antioxidant comprising one or more phenolic compounds having the structure of formula (I):

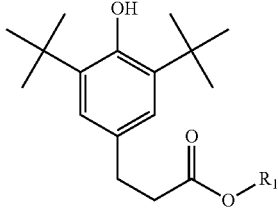

wherein $R_1$ is a linear or branched alkyl group having from 12 to 20 carbon atoms; and
b) one or more second phenolic antioxidants independently selected from:
  a mono-hydroxybenzene having lower steric hindrance than the first phenolic antioxidant;
  a di-hydroxybenzene; and/or
  a tri-hydroxybenzene.

According to a third aspect of the present invention there is provided a stabilised composition, comprising:
a) a polyol and/or a polyurethane; and
b) a stabilising composition comprising:
  i. a first phenolic antioxidant comprising one or more phenolic compounds having the structure of formula (I):

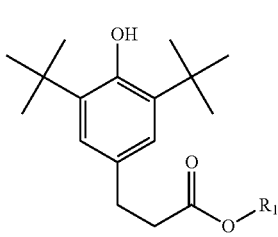

wherein $R_1$ is a linear or branched alkyl group having from 12 to 20 carbon atoms; and
  ii. one or more second phenolic antioxidants independently selected from:
    a mono-hydroxybenzene having lower steric hindrance than the first phenolic antioxidant;
    a di-hydroxybenzene; and/or
    a tri-hydroxybenzene.

The description that follows is applicable, where appropriate, to the first, second and third aspects of the present invention.

In this context, the term 'stabilising composition' means an antioxidant stabilising composition.

The inventors of the present invention have surprisingly found that a stabilising composition comprising a first phenolic antioxidant comprising one or more phenolic compounds having the structure shown, and one or more second phenolic antioxidants independently selected from a mono-hydroxybenzene having lower steric hindrance than the first phenolic antioxidant, a di-hydroxybenzene and/or a tri-hydroxybenzene, can be used to stabilise a polyol and/or a polyurethane.

Advantageously, the stabilising compositions of the present invention have good hydrolytic stability, particularly when compared to industry bench-mark stabilising compositions including a phenolic antioxidant and a phosphite antioxidant. Thus, the stabilising compositions of the present invention are not limited to use as 'post-treatment' additives during polyurethane production, for example the stabilising composition may be added to the precursor polyol.

Further advantageously, the stabilising compositions of the present invention have a low contribution to volatile organic compounds (VOC) and low gaseous and condensable emissions (FOG). This may, at least in part, be due to the minimal volatile emissions (VOC and FOG) from the first phenolic antioxidant.

In addition, the stabilising compositions of the present invention have a high level of scorch protection. Without wishing to be bound by any such theory, it is believed that the presence of the one or more second phenolic antioxidants increases the activity of the stabilising composition with regards to scorch protection. More specifically, the one or more second phenolic antioxidants may be a mono-hydroxybenzene having lower steric hindrance than the first phenolic antioxidant, a di-hydroxybenzene and/or a tri-hydroxybenzene. All of these components have a higher activity with regards to scorch protection than the sterically hindered first phenolic antioxidant. Thus, when the one or more second phenolic antioxidants are added to the first phenolic antioxidant, the activity of the stabilising composition with regards to scorch protection, is increased.

It has unexpectedly been found that the above advantages of the stabilising composition, in particular the high level of scorch performance, can be realised without the use of an aminic component i.e. the stabilising composition of the present invention does not contain any aminic component. This is beneficial since there are regulatory concerns surrounding the use of aminic components in stabilising compositions, as outlined above.

The first phenolic antioxidant comprises one or more phenolic compounds having the structure of formula (I):

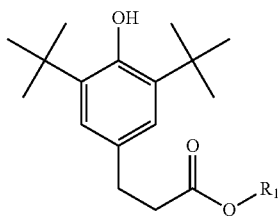

(I)

wherein $R_1$ is a linear or branched alkyl group having from 12 to 20 carbon atoms.

Preferably, $R_1$ is a linear or branched alkyl group having from 12 to 15 carbons atoms. More preferably, $R_1$ is a linear or branched alkyl group having from 13 to 15 carbon atoms.

Preferably, the first phenolic antioxidant comprises a mixture of two or more phenolic compounds having the structure of formula (I), wherein $R_1$ is different in each phenolic compound.

The first phenolic antioxidant may comprise a mixture of two or more phenolic compounds having the structure of formula (I), wherein $R_1$ is different in each phenolic compound and is selected from a linear alkyl group having 12 carbon atoms, a branched alkyl group having 12 carbon atoms, a linear alkyl group having 13 carbon atoms, a branched alkyl group having 13 carbon atoms, a linear alkyl group having 14 carbon atoms, a branched alkyl group having 14 carbon atoms, a linear alkyl group having 15 carbon atoms and/or a branched alkyl group having 15 carbon atoms.

Preferably, the first phenolic antioxidant comprises a mixture of two or more phenolic compounds having the structure of formula (I), wherein $R_1$ is different in each phenolic compound and is selected from a linear alkyl group having 13 carbon atoms, a branched alkyl group having 13 carbon atoms, a linear alkyl group having 14 carbon atoms, a branched alkyl group having 14 carbon atoms, a linear alkyl group having 15 carbon atoms and/or a branched alkyl group having 15 carbon atoms.

One particularly preferred first phenolic antioxidant comprises C13-C15 linear and branched alkyl esters of 3-(3'5'-di-t-butyl-4'-hydroxyphenyl) propionic acid (ANOX® 1315—CAS 171090-93-0).

Advantageously, the first phenolic antioxidant has a low contribution to VOC and FOG. The first phenolic antioxidant may have a lower contribution to VOC and FOG than other known phenolic antioxidants, for example 2,6-di-tert-butyl-4-sec-butylphenol (ISONOX® 132—CAS 17540-75-9), 2,6-di-tert-butyl-4-nonylphenol (ISONOX® 232—CAS 4306-88-1), and benzenepropanoic acid, 3,5-bis(1,1-dimethyl-ethyl)-4-hydroxy-, C7-C9 branched alkyl esters (IRGANOX® 1135—CAS 125643-61-0).

The first phenolic antioxidant is preferably a liquid at ambient conditions i.e. at atmospheric pressure (101.325 kPa) and a temperature of 25° C.

The first phenolic antioxidant may be capable of dissolving the one or more second phenolic antioxidants. This is particularly advantageous where the one or more second phenolic antioxidants is in solid form, since overall a liquid stabilising composition can be achieved. This may be more easily dispersed within a polymer, for example a polyol and/or polyurethane.

The one or more second phenolic antioxidants are independently selected from: a mono-hydroxybenzene having lower steric hindrance than the first phenolic antioxidant; a di-hydroxybenzene; and/or a tri-hydroxybenzene.

By 'lower steric hindrance' preferably we mean that the hydroxy group directly attached to the benzene ring in the mono-hydroxybenzene is less sterically hindered by substituents at one or both of the ortho-positions, compared to the first phenolic antioxidant. For example, the mono-hydroxybenzene may have substituents at one or both or neither of the ortho-positions, provided that the hydroxy group directly attached to the benzene ring is less sterically hindered than the hydroxy group in the first phenolic antioxidant.

As outlined previously, the one or more second phenolic antioxidants are believed to increase the activity of the stabilising composition, in particular with regards to scorch protection. Thus, the one or more second phenolic antioxidants may be referred to as phenolic 'booster' antioxidant/component.

The one or more second phenolic antioxidants may be optionally substituted.

The mono-hydroxybenzene may be a monomer, a dimer or an oligomer.

The mono-hydroxybenzene dimer may be a bridged bis-phenol, for example a sulphur-bridged bisphenol or a $CR_2$-bridged bisphenol. Sulphur-bridged bisphenols may include 4,4'-thiobis(2-t-butyl-5-methylphenol) (LOWINOX® TBM-6—CAS 96-69-5); and 2,2'-thiobis(6-t-butyl-4-methylphenol) (LOWINOX® TBP-6—CAS 90-66-4). In the $CR_2$-bridged bisphenol, the R may be hydrogen, for example 2,2'-methylenebis(6-nonyl-p-cresol) (NAUGAWHITE®—CAS 7786-17-6).

Preferably, the mono-hydroxybenzene is selected from α-tocopherol; 4,4'-thiobis(2-t-butyl-5-methylphenol) (LOWINOX® TBM-6—CAS 96-69-5); 2,2'-thiobis(6-t-butyl-4-methylphenol) (LOWINOX® TBP-6—CAS 90-66-4); 2,2'-methylenebis(6-t-butyl-4-methylphenol) (LOWINOX® 22M46—CAS 119-47-1); 4,4'-butylidenebis[2-t-butyl-5-methylphenol] (LOWINOX® 44B25—CAS 85-60-9); 2,2'-methylenebis(6-nonyl-p-cresol) (NAUGAWHITE®—CAS 7786-17-6); and/or phenol, 4-methyl-, reaction products with dicyclopentadiene and isobutylene (LOWINOX® CPL—CAS 68610-51-5).

The phenol, 4-methyl-, reaction products with dicyclopentadiene and isobutylene (LOWINOX® CPL—CAS 68610-51-5) preferably have the following structure:

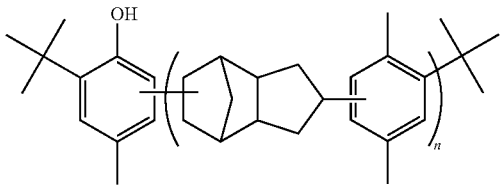

Preferably, the di-hydroxybenzene is selected from 4-tert-butylcatechol (4-TBC); 2,5-di-tert-amyl-hydroquinone (LOWINOX® AH25—CAS 79-74-3); benzene-1,2-diol (catechol); benzene-1,3-diol (resorcinol); and/or benzene-1,4-diol (hydroquinone).

The tri-hydroxybenzene may be a pyrogallol i.e. where the hydroxy groups are positioned at the 1, 2 and 3 positions on the benzene ring; or a hydroxyquinol i.e. where the hydroxy groups are positioned at the 1, 2 and 4 positions on the benzene ring.

Preferably, the tri-hydroxybenzene is selected from benzene-1,2,3-triol (pyrogallol); propyl 3,4,5-trihydroxybenzoate (propyl gallate); and/or benzene-1,2,4-triol (hydroxyquinol).

In one embodiment, the one or more second phenolic antioxidants are independently selected from:

a di-hydroxybenzene selected from 4-tert-butylcatechol, 2,5-di-tert-amyl-hydroquinone, benzene-1,2-diol and/or benzene-1,3-diol;

a tri-hydroxybenzene selected from benzene-1,2,3-triol, propyl 3,4,5-trihydroxybenzoate, and/or benzene-1,2,4-triol, and/or a dimer or oligomer of mono-hydroxybenzene monomers selected from 4,4'-butylidenebis[2-t-butyl-5-methylphenol], and/or phenol, 4-methyl-, reaction products with dicyclopentadiene and isobutylene.

The one or more second phenolic antioxidants may be present in an amount of from about 1 to about 50 wt. % based on the total weight of the stabilising composition.

Preferably, the one or more second phenolic antioxidants are present in an amount of from about 1 to about 45 wt. %; from about 1 to about 40 wt. %; from about 1 to about 35 wt. %; from about 1 to about 30 wt. %; from about 5 to about 30 wt. %; from about 10 to about 30 wt. %; or from about 10 to about 25 wt. %, based on the total weight of the stabilising composition.

By using the one or more second phenolic antioxidants in a relatively small amount in the stabilising composition, the contribution of the second phenolic antioxidant(s) to VOC and FOG is minimalised.

The stabilising composition is preferably a liquid at ambient conditions i.e. at atmospheric pressure (101.325 kPa) and a temperature of 25° C. This may provide the advantage of the stabilising composition being easily mixed with a polyol and/or a polyurethane.

The inventors of the present invention have developed a stabilising composition combining a low-emissive first phenolic antioxidant and one or more second phenolic antioxidants which enhance the activity of the stabilising composition. Overall, the stabilising composition of the present invention has a low contribution to VOC and FOG and provides a high level of scorch protection. It has surprisingly been found that the contribution to VOC and FOG is significantly lower than the prior art stabilising compositions, particularly those involving a phenolic antioxidant and a 'booster' component.

The stabilising composition according to the present invention is particularly effective at stabilising polyols and/or polyurethanes. The polyol and/or polyurethane may be stabilised against oxidative, thermal and/or radiation (for example light e.g. UV light) induced degradation.

The polyol may, for example, comprise a polyether polyol and/or a polyester polyol. The polyol may be a precursor for a polyurethane.

The polyurethane comprises a polyurethane foam.

The amount of stabilising composition in the stabilised composition may be from about 0.01 to about 10%; from about 0.01 to about 5%; from about 0.01% to about 3.5%; or from about 0.01 to about 2% by weight of the polyol and/or polyurethane.

The invention will now be more particularly described by the following examples.

EXAMPLES

Table 1 outlines details relating to different stabilising components used in the examples. Hereinafter, the stabilising components will be referred to using the name given in the 'component' column.

TABLE 1

| Component | Type | CAS No. | Description | Structure |
|---|---|---|---|---|
| ANOX® 1315 | Phenolic | 171090-93-0 | C13-C15 linear and branched alkyl esters of 3-(3'-5'-di-t-butyl-4'-hydroxylphenyl)propionic acid | |
| 4-TBC | Phenolic booster | 98-29-3 | 4-tertbutyl catechol | |
| LOWINOX® TBP-6 | Phenolic booster | 90-66-4 | 2,2'-thiobis(6-t-butyl-4-methylphenol) | |

TABLE 1-continued

| Component | Type | CAS No. | Description | Structure |
|---|---|---|---|---|
| IRGANOX® 1135 (BASF) | Phenolic | 125643-61-0 | Benzenepropanoic acid, 3,5-bis(1,1-dimethyl-ethyl)-4-hydroxy-,C7-C9 branched alkyl esters | |
| IRGAFOS® 38 (BASF) | Phosphite | 145650-60-8 | Bis(2,4-di-tert.-butyl-6-methylphenyl)-ethyl-phosphite | |
| PS-1 (BASF) | Booster | — | 3-(2-acetyl-5-isooctylphenyl)-5-isooctylbenzofuran-2-one | |
| NAUGARD® PS-30 | Amine | 68411-46-1 | Butylated, octylated diphenylamine | R = H, butyl, octyl |
| LOWINOX® TBM-6 | Phenolic booster | 96-69-5 | 4,4'-thiobis(2-t-butyl-5-methylphenol) | |

The following stabilising compositions are commercially available and may be considered as industry bench-mark stabilising compositions:

IRGASTAB® PUR68 (BASF)—7:1:1 blend of IRGANOX® 1135, IRGAFOS® 38 and a benzofuran-2-one (PS-1)

Examples 1 to 4

Preparation of Stabilised Low Density Polyurethane Foams

Three stabilising compositions with the stabilisers shown in Table 2, were prepared by mixing the relative amounts of the stabilisers. The stabilising compositions of examples 1 and 2 had a phenolic component and a phenolic booster component, and are in accordance with the present invention. Example 3 represents an industry bench-mark stabilising composition involving a phenolic component, a phosphite component and a non-phenolic 'booster' component, and is a comparative example. Example 4 represents an industry bench-mark stabilising composition involving a phenolic component and an aminic component, and is a comparative example.

TABLE 2

| Example | Stabiliser | Amount (per hundred parts polyol) |
| --- | --- | --- |
| 1 | ANOX ® 1315 | 0.405 |
|   | 4-TBC | 0.045 |
| 2 | ANOX ® 1315 | 0.405 |
|   | LOWINOX ® TBM-6 | 0.045 |
| 3 | IRGANOX ® 1135 | 0.35 |
|   | IRGAFOS ® 38 | 0.05 |
|   | PS-1 | 0.05 |
| 4 | ANOX ® 1315 | 0.225 |
|   | NAUGARD ® PS-30 | 0.225 |

For each of the stabilising compositions outlined in Table 2, the amount shown was dissolved in 104.85 g of a polyether polyol (AT300 manufactured by Mitsui). To this, 0.79 g of TEGOSTAB® B8229 (Evonik), 0.21 g of a solution containing DABCO® 33LV (Air Products) and DABCO® BL11 (Air Products), and 6.53 g of deionised water were added and the reaction mixture stirred vigorously for 30 seconds at 1500 rpm. 0.27 g of tin(II) ethylhexanoate (Sigma Aldrich) was added and the reaction mixture stirred vigorously for 15 seconds at 1500 rpm. 83.2 g of isocyanate (Bayer, 2,4-toluylene di-isocyanate and 2,6-toluylene di-isocyanate mixture) was added and the reaction mixture stirred vigorously for 10 seconds at 1500 rpm.

The resulting mixture was poured into a 25 cm×25 cm×25 cm box lined with Kraft paper and the exothermic temperature was measured during foaming to a foam block.

Each foam block was either a) cured at 95° C. in a conventional oven for 30 minutes and allowed to cool to ambient temperature, or b) heated in a microwave oven at a pre-determined power level for a pre-determined time to induce temperatures that represented those experienced in polyurethane foam production, then cured at 95° C. in a conventional oven. The density of the foam block was roughly 20 kg/m³.

Foam blocks with the stabilising compositions of examples 1 to 3 were subjected to step b) above and the discolouration of the foam due to scorch was measured. The discolouration was measured in terms of Yellowness Index (YI). The lower the YI value, the less discolouration and hence the less scorch. The higher the YI value, the greater discolouration and hence the higher scorch. The results are shown in Table 3.

TABLE 3

| Example | YI Value |
| --- | --- |
| 1 | 24.51 |
| 2 | 28.88 |
| 3 | 19.69 |

It can be seen from the results that the YI values of the foam blocks stabilised with the stabilising compositions according to the present invention (examples 1 and 2) are comparable to YI value of the foam block stabilised with the industry bench-mark stabilising composition (Example 3).

Separate foam blocks with the stabilising compositions of examples 1 to 4 were cured at 95° C. in a conventional oven for 30 minutes and allowed to cool to ambient temperature (step a) above). The foam blocks were then exposed to NOx gases at a temperature of 60° C. in accordance with standard test method AATCC Test Method 23-2005. The discolouration after 2 hours, 3 hours and 4 hours was measured in terms of Yellowness Index (YI). The results are shown in Table 4.

TABLE 4

| Example | YI Value (2 h) | YI Value (3 h) | YI Value (4 h) |
| --- | --- | --- | --- |
| 1 | 31.81 | 37.35 | 41.73 |
| 2 | 47.20 | 54.38 | 61.60 |
| 3 | 27.06 | 37.70 | 43.40 |
| 4 | 44.58 | 52.64 | 58.25 |

Stabilising compositions are known to contribute adversely to discolouration of polyurethane foams on exposure to pollutant gases, in particular NOx gases. It can be seen from the results that the YI values at 2 hours, 3 hours and 4 hours for the foam blocks stabilised with stabilising compositions according to the present invention, (examples 1 and 2) are comparable to YI values of the foam blocks stabilised with the industry bench-mark stabilising compositions (examples 3 and 4).

Examples 5 to 14

Oxidation Induction Temperature of Stabilised Polyether Polyols

Stabilising compositions according to the present invention have also been shown to stabilise polyether polyols (the precursor to polyurethane foams).

Ten polyether polyol samples were stabilised using the stabilising compositions shown in Table 5. Examples 5 to 11 used stabilising compositions in accordance with the present invention. Examples 12 to 14 used an industry bench-mark stabilising composition involving a phenolic component, a phosphite component and a non-phenolic 'booster' component, and are comparative examples.

Differential scanning calorimetry was used to determine the Oxidation Induction Temperature (OIT) of the stabilised polyether polyol samples. The OIT was measured according to standard test method ASTM 3895, and did not take into account pre-oxidation events. Differential scanning calorimetry was carried out in oxygen and the temperature ranged from 25° C. to 300° C., increasing at a rate of 10° C. per minute. The OIT results are shown in Table 5.

TABLE 5

| Example | Stabiliser | Amount (per hundred parts polyol) | OIT (° C.) |
| --- | --- | --- | --- |
| 5 | ANOX ® 1315 | 0.27 | 184.68 |
|   | 4-TBC | 0.03 |   |
| 6 | ANOX ® 1315 | 0.405 | 190.79 |
|   | 4-TBC | 0.045 |   |
| 7 | ANOX ® 1315 | 0.54 | 194.28 |
|   | 4-TBC | 0.06 |   |
| 8 | ANOX ® 1315 | 0.27 | 180.01 |
|   | LOWINOX ® TBP-6 | 0.03 |   |

TABLE 5-continued

| Example | Stabiliser | Amount (per hundred parts polyol) | OIT (° C.) |
|---|---|---|---|
| 9 | ANOX ® 1315 | 0.405 | 184.52 |
|   | LOWINOX ® TBM-6 | 0.045 |  |
| 10 | ANOX ® 1315 | 0.54 | 189.15 |
|   | LOWINOX ® TBP-6 | 0.06 |  |
| 11 | ANOX ® 1315 | 0.54 | 195.32 |
|   | LOWINOX ® TBM-6 | 0.06 |  |
| 12 | IRGANOX ® 1135 | 0.23 | 183.03 |
|   | IRGAFOS ® 38 | 0.03 |  |
|   | PS-1 | 0.03 |  |
| 13 | IRGANOX ® 1135 | 0.35 | 190.06 |
|   | IRGAFOS ® 38 | 0.05 |  |
|   | PS-1 | 0.05 |  |
| 14 | IRGANOX ® 1135 | 0.47 | 194.40 |
|   | IRGAFOS ® 38 | 0.07 |  |
|   | PS-1 | 0.07 |  |

From the results it can be seen that the polyether polyol samples stabilised with the stabilising composition according to the present invention (examples 5 to 11) had comparable OIT values to those samples stabilised with the industry bench-mark stabilising composition (examples 12 to 14). OIT values are indicative of the likely scorch performance.

Examples 15 to 23

Discolouration of Stabilised Polyether Polyols

Nine polyether polyol samples were stabilised using the stabilising compositions outlined in Table 6. Examples 15 to 20 used stabilising compositions in accordance with the present invention. Examples 21 to 23 used an industry bench-mark stabilising composition involving a phenolic component, a phosphite component and a non-phenolic 'booster' component, and are comparative examples.

Accelerated heat aging was carried out on each of the polyether polyol samples for 4 hours at 180° C., and the discolouration was measured using the Yellowness Index (YI).

TABLE 6

| Example | Stabiliser | Amount (per hundred parts polyol) | YI Value (4 h) |
|---|---|---|---|
| 15 | ANOX ® 1315 | 0.27 | 6.66 |
|   | 4-TBC | 0.03 |  |
| 16 | ANOX ® 1315 | 0.405 | 10.56 |
|   | 4-TBC | 0.045 |  |
| 17 | ANOX ® 1315 | 0.54 | 15.84 |
|   | 4-TBC | 0.06 |  |
| 18 | ANOX ® 1315 | 0.27 | 8.05 |
|   | LOWINOX ® TBP-6 | 0.03 |  |
| 19 | ANOX ® 1315 | 0.405 | 10.36 |
|   | LOWINOX ® TBP-6 | 0.045 |  |
| 20 | ANOX ® 1315 | 0.54 | 10.97 |
|   | LOWINOX ® TBM-6 | 0.06 |  |
| 21 | IRGANOX ® 1135 | 0.23 | 2.91 |
|   | IRGAFOS ® 38 | 0.03 |  |
|   | PS-1 | 0.03 |  |
| 22 | IRGANOX ® 1135 | 0.35 | 4.00 |
|   | IRGAFOS ® 38 | 0.05 |  |
|   | PS-1 | 0.05 |  |
| 23 | IRGANOX ® 1135 | 0.47 | 4.37 |
|   | IRGAFOS ® 38 | 0.07 |  |
|   | PS-1 | 0.07 |  |

From the results it can be seen that the polyether polyol samples stabilised with the stabilising composition according to the present invention (examples 15 to 20) showed comparable discolouration to those samples stabilised with the industry bench-mark stabilising composition (examples 21 to 23).

Examples 24 to 26

Viscosity and Thermogravimetric Analysis of Stabilising Compositions

Three stabilising compositions with the stabilisers shown in Table 7, were prepared by mixing the relative amounts of the stabilisers.

TABLE 7

| Example | Stabiliser | Relative Amounts |
|---|---|---|
| 24 | ANOX ® 1315 | 0.9 |
|   | 4-TBC | 0.1 |
| 25 | ANOX ® 1315 | 0.9 |
|   | LOWINOX ® TBP-6 | 0.1 |
| 26 | IRGANOX ® 1135 | 0.45 |
|   | IRGAFOS ® 38 | 0.05 |
|   | PS-1 | 0.05 |

The dynamic viscosity for each of the stabilising compositions was determined using a Brookfield viscometer. The results are shown in Table 8.

TABLE 8

| | Dynamic Viscosity | | |
|---|---|---|---|
| Example | 25° C. | 40° C. | 60° C. |
| 24 | 302 | 88 | 28 |
| 25 | 392 | 125 | 40 |
| 26 | 1060 | 250 | 53 |

It is important for the stabilising compositions to be liquids under operating conditions in order to be easily handled. From the results it can be seen that the stabilising compositions according to the present invention (examples 24 and 25) have viscosities comparable to the industry bench-mark stabilising composition (Example 26).

Thermogravimetric analysis of each of the stabilising compositions was determined using standard test method ASTM E1131. The results are shown in Table 9.

TABLE 9

| | ° C. | | |
|---|---|---|---|
| Example | 10% wt. loss | 25% wt. loss | 50% wt. loss |
| 24 | 179.87 | 247.87 | 280.02 |
| 25 | 218.82 | 253.21 | 278.89 |
| 26 | 206.90 | 228.78 | 247.64 |

Thermogravimetric analysis indicates the thermal stability of a stabilising composition. The thermal stability of a stabilising composition is important due to the high temperatures e.g. greater than 170° C., that may be experienced during polyurethane production.

From the results it can be seen that the stabilising compositions according to the present invention (examples 24 and 25) have comparable thermal stability to the industry bench-mark stabilising composition (Example 26).

We claim:

1. A stabilized composition, comprising:
   a) a polyurethane, or a polyurethane and a polyol; and
   b) a stabilizing composition comprising:
      i. a first phenolic antioxidant comprising two or more phenolic compounds having the structure of formula (I):

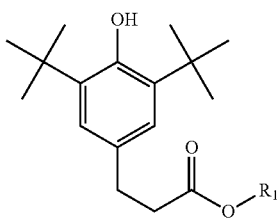

wherein $R_1$ is a linear or branched alkyl group having from 12 to 20 carbon atoms; and
   ii) one or more second phenolic antioxidants independently selected from the group consisting of:
      a mono-hydroxybenzene selected from the group consisting of α-tocopherol; 4,4'-thiobis(2-t-butyl-5-methylphenol), 2,2'-thiobis(6-t-butyl-4-methylphenol), 2,2'-methylenebis(6-t-butyl-4-methylphenol), 4,4'-butylidenebis[2-t-butyl-5-methylphenol], 2,2'-methylenebis(6-nonyl-p-cresol) and phenol, 4-methyl-, reaction products with dicyclopentadiene and isobutylene;
      a di-hydroxybenzene selected from the group consisting of 4-tert-butylcatechol, 2,5-di-tert-amyl-hydroquinone, benzene-1,2-diol, benzene-1,3-diol, and benzene-1,4-diol, and
      a tri-hydroxybenzene selected from the group consisting of benzene-1,2,3-triol, propyl 3,4,5-trihydroxybenzoate; and benzene-1,2,4-triol,
   wherein the stabilizing composition does not contain a benzofuranone-based booster component.

2. The stabilized composition of claim 1, wherein the stabilizing composition does not contain an amine-containing antioxidant.

3. The stabilized composition of claim 1, wherein the polyol is present with the polyurethane and comprises a polyether polyol and/or a polyester polyol.

4. The stabilized composition of claim 1, wherein the polyurethane comprises a polyurethane foam.

5. The stabilized composition of claim 1, wherein the amount of stabilizing composition is present from about 0.01 to about 10%, by weight of the polyurethane or by weight of the polyurethane and the polyol.

6. The stabilized composition of claim 5, wherein the amount of stabilizing composition is present from about 0.01 to about 5%, by weight of the polyurethane or by weight of the polyurethane and the polyol.

7. The stabilized composition of claim 5, wherein the amount of stabilizing composition is present from about 0.01 to about 2%, by weight of the polyurethane or by weight of the polyurethane and the polyol.

8. The stabilized composition of claim 1, wherein R1 is a linear or branched alkyl group having from 12 to 15 carbon atoms.

9. The stabilized composition of claim 1, wherein R1 is a linear or branched alkyl group having from 13 to 15 carbon atoms.

10. The stabilized composition of claim 8, wherein R1 is selected from the group consisting of a linear alkyl group having 12 carbon atoms, a branched alkyl group having 12 carbon atoms, a linear alkyl group having 13 carbon atoms, a branched alkyl group having 13 carbon atoms, a linear alkyl group having 14 carbon atoms, a branched alkyl group having 14 carbon atoms, a linear alkyl group having 15 carbon atoms, and a branched alkyl group having 15 carbon atoms.

11. The stabilized composition of claim 8, wherein R1 is selected from the group consisting of a linear alkyl group having 13 carbon atoms, a branched alkyl group having 13 carbon atoms, a linear alkyl group having 14 carbon atoms, a branched alkyl group having 14 carbon atoms, a linear alkyl group having 15 carbon atoms, and a branched alkyl group having 15 carbon atoms.

12. The stabilized composition of claim 1, wherein the first phenolic antioxidant comprises C13-C15 linear and branched alkyl esters of 3-(3'5'-di-t-butyl-4'-hydroxyphenyl) propionic acid.

13. The stabilized composition of claim 1, wherein the first phenolic antioxidant is a liquid at ambient conditions.

14. The stabilized composition of claim 1, wherein the one or more second phenolic antioxidants are selected from the group consisting of:
   a di-hydroxybenzene selected from the group consisting of 4-tert-butylcatechol, 2,5-di-tert-amyl-hydroquinone, benzene-1,2-diol, and benzene-1,3-diol,
   a tri-hydroxybenzene selected from the group consisting of benzene-1,2,3-triol; propyl 3,4,5-trihydroxybenzoate; and benzene-1,2,4-triol; and
   a dimer or oligomer of mono-hydroxybenzene monomers selected from the group consisting of 4,4'-butylidenebis[2-t-butyl-5-methylphenol], and phenol, 4-methyl-, reaction products with dicyclopentadiene and isobutylene.

15. The stabilized composition of claim 1, wherein the one or more second phenolic antioxidants are present in the stabilizing composition in an amount of from about 1 to about 50 wt. % based on the total weight of the stabilizing composition.

16. The stabilized composition of claim 15, wherein the one or more second phenolic antioxidants are present in the stabilizing composition in an amount of from about 1 to about 35 wt. %, based on the total weight of the stabilizing composition.

17. The stabilized composition of claim 15, wherein the one or more second phenolic antioxidants are present in the stabilizing composition in an amount of from about 5 to about 30 wt. %, based on the total weight of the stabilizing composition.

18. The stabilized composition of claim 15, wherein the one or more second phenolic antioxidants are present in the stabilizing composition in an amount of from about 10 to about 25 wt. %, based on the total weight of the stabilizing composition.

19. The stabilized composition of claim 1, wherein the stabilizing composition is a liquid at ambient conditions.

* * * * *